(12) United States Patent
Harrand et al.

(10) Patent No.: US 8,619,622 B2
(45) Date of Patent: Dec. 31, 2013

(54) NETWORK ON CHIP WITH QUALITY OF SERVICE

(75) Inventors: Michel Harrand, Saint Egreve (FR); Yves Durand, Saint Ismier (FR)

(73) Assignee: Kalray, Orsay (FR)

( * ) Notice: Subject to any disclaimer, the term of this patent is extended or adjusted under 35 U.S.C. 154(b) by 572 days.

(21) Appl. No.: 12/830,940

(22) Filed: Jul. 6, 2010

(65) Prior Publication Data
US 2011/0026400 A1    Feb. 3, 2011

(30) Foreign Application Priority Data

Jul. 29, 2009  (FR) ...................................... 09 03734

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/253; 370/229; 370/230; 370/231; 370/232; 370/233; 370/234; 370/235; 370/236; 370/252

(58) Field of Classification Search
USPC .......... 370/229–235, 236, 247, 252, 253, 257
See application file for complete search history.

(56) References Cited

U.S. PATENT DOCUMENTS

| 8,194,690 B1 * | 6/2012 | Steele et al. ................... 370/412 |
| 2005/0071471 A1 | 3/2005 | Saenz, III |
| 2005/0203988 A1 * | 9/2005 | Nollet et al. ................... 709/201 |
| 2007/0195748 A1 * | 8/2007 | Radulescu ..................... 370/351 |
| 2007/0237081 A1 * | 10/2007 | Kodialam et al. .............. 370/235 |
| 2007/0274228 A1 * | 11/2007 | Nandagopalan et al. ...... 370/252 |
| 2009/0285222 A1 * | 11/2009 | Hoover et al. ................. 370/397 |
| 2011/0026400 A1 * | 2/2011 | Harrand et al. ................ 370/235 |

FOREIGN PATENT DOCUMENTS

EP    1 701 274 B1    2/2008

OTHER PUBLICATIONS

E. Bolotin et al., "Cost considerations in network on chip," Integration, The VLSI Journal, vol. 38, No. 1, Oct. 1, 2004, pp. 19-42.
R. Cruz, "A Calculus for Network Delay, Part I: Network Elements in Isolation," IEEE Transactions on Information Theory, vol. 37, No. 1, Jan. 1, 1991, pp. 114-131.
E. Bolotin et al., "QNoC: QoS architecture and design process for network on chip," Journal of Systems Architecture, Elsevier, vol. 50, No. 2-3, Feb. 1, 2004, pp. 105-128.
I. Walter et al., "Access Regulation to Hot-Modules in Wormhole NoCs," IEEE Proceedings of the First International Symposium on Networks-on-Chip, May 1, 2007, pp. 137-148.
K. Sup Shim et al., "Static Virtual Channel Allocation in Oblivious Routing," ACM/IEEE International Symposium on Networks-on-Chip, May 10, 2009, pp. 38-43.
Search Report issued in French Patent Application No. 09 03734, on Mar. 22, 2010 (with translation).

* cited by examiner

*Primary Examiner* — Benjamin H Elliott, IV
(74) *Attorney, Agent, or Firm* — Oliff and Berridge, PLCK

(57) ABSTRACT

The present invention relates to a method for limiting the throughput of a communication in a meshed network, comprising the following steps: allocating fixed paths to communications likely to be established on the network; identifying the communications likely to take a mesh segment; allocating respective throughput quotas to the identified communications such that the sum of these quotas is less than or equal to a nominal throughput of said segment; and measuring the throughput of each communication at the input of the network and suspending the communication when its quota is reached.

8 Claims, 7 Drawing Sheets

| CK  | 0  | 1  | 2  | 3  | 4  | 5  | 6  | 7  | 8  | 9  | 10 | 11 | 12 | 13 | 14 | 15 |
|-----|----|----|----|----|----|----|----|----|----|----|----|----|----|----|----|----|
| N   | N0 | N1 |    |    |    |    |    |    |    |    |    |    |    |    |    |    |
| L   | L0 | L1 |    |    |    |    |    |    |    |    |    |    |    |    |    |    |
| W   | W0 | W1 | W2 |    |    |    |    |    |    |    |    |    |    |    |    |    |
| S   | S0 | S1 | S2 | S3 | S4 | S5 | S6 | S7 | S8 |    |    |    |    |    |    |    |
|     |    |    |    |    |    |    |    |    |    |    |    |    |    |    |    |    |
| QE  | N0 | L0 | W0 | S0 | N1 | L1 | W1 | S1 | W2 | S2 | S3 | S4 | S5 | S6 | S7 | S8 |
|     |    |    |    |    |    |    |    |    |    |    |    |    |    |    |    |    |
| FN  | 0  | 1  | 1  | 1  | 0  |    |    |    |    |    |    |    |    |    |    |    |
| FL  | 1  | 1  | 1  | 1  | 1  | 0  |    |    |    |    |    |    |    |    |    |    |
| FW  | 1  | 2  | 2  | 2  | 2  | 2  | 1  | 1  | 0  |    |    |    |    |    |    |    |
| FS  | 1  | 2  | 3  | 3  | 4  | 5  | 6  | 6  | 7  | 6  | 5  | 4  | 3  | 2  | 1  | 0  |
| Lat | 0  | 1  | 2  | 3  | 3  | 4  | 5  | 6  | 6  | 7  | 7  | 7  | 7  | 7  | 7  | 7  |

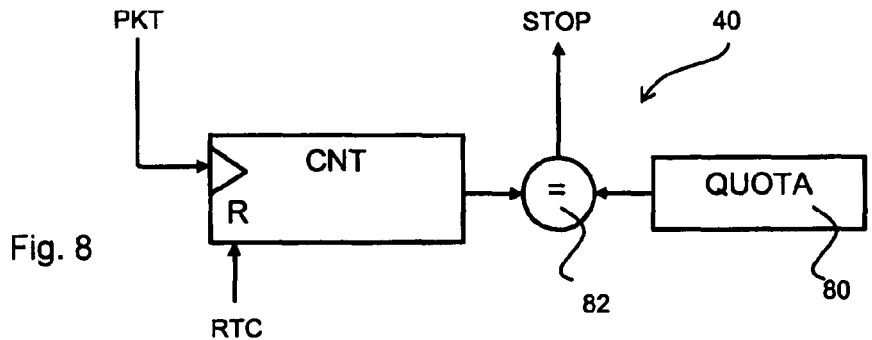
Fig. 8
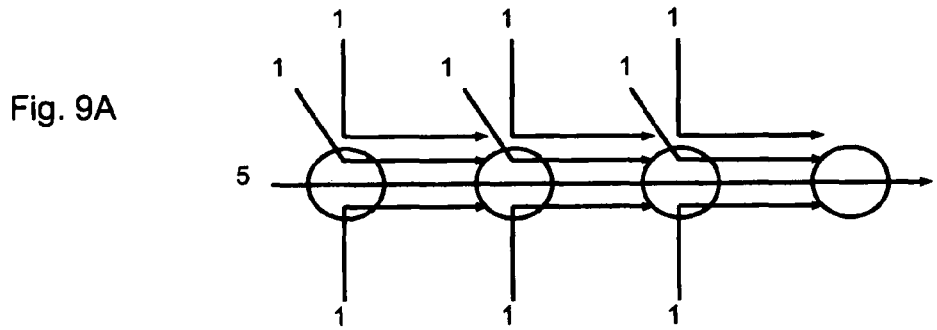
Fig. 9A
| CK | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| N  |   |   |   | X |   |   |   |   |   |   |   |   |   |   |   |   |   |   |   |   |   |
| L  |   |   |   | X |   |   |   |   |   |   |   |   |   |   |   |   |   |   |   |   |   |
| S  |   |   |   | X |   |   |   |   |   |   |   |   |   |   |   |   |   |   |   |   |   |
| W  |   |   |   |   | w | w | w | w | w | w | w | w | w |   |   |   | w | w | w | w | w |
| QE |   |   |   | X | X | X | w | w | w | w | w | w | w | w | w | w | w | w | w | w | w |
Fig. 9B

Fig. 9C

| CK | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|
| N2 | | | x | | x | | | | | | | | x | | | | | | | | x | | | | | | | |
| L2 | | | x | | x | | | | | | | | x | | | | | | | | x | | | | | | | |
| S2 | | | x | | x | | | | | | | | x | | | | | | | | x | | | | | | | |
| W2 | | | w | w | w | w | w | w | w | w | w | w | w | w | w | w | w | w | w | w | w | w | w | w | w | w | w | w |
| | | | | | | | | | | | | | | | | | | | | | | | | | | | | |
| QE | | | x | x | x | w | w | x | x | x | w | w | w | x | x | w | w | w | w | w | x | x | x | w | w | w | w | w |
| FW | | | 1 | 2 | 3 | 3 | 4 | 5 | 6 | 6 | 6 | 6 | 6 | 7 | 8 | 9 | 9 | 9 | 8 | 7 | 6 | 7 | 8 | 9 | 9 | 9 | 8 | 7 | 6 |

| CK | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|
| N4 | x | | | | x | | | | | | | | x | | | | | | | | x | | | | | | | |
| L4 | x | | | | x | | | | | | | | x | | | | | | | | x | | | | | | | |
| S4 | x | | | | x | | | | | | | | x | | | | | | | | x | | | | | | | |
| W4 | w | w | w | w | w | w | w | w | w | w | w | w | w | w | w | w | w | w | w | w | w | w | w | w | w | w | w | w |
| | | | | | | | | | | | | | | | | | | | | | | | | | | | | |
| QE | x | w | w | w | x | x | x | w | w | w | w | w | x | x | x | w | w | w | w | w | x | w | x | w | w | w | w | w |
| FW | 1 | 2 | 3 | 3 | 4 | 5 | 6 | 6 | 6 | 6 | 6 | 6 | 7 | 8 | 9 | 9 | 9 | 9 | 9 | 9 | 10 | 11 | 12 | 12 | 12 | 11 | 10 | 9 |

NETWORK ON CHIP WITH QUALITY OF SERVICE

BACKGROUND OF THE INVENTION

The invention relates to Systems on Chip (SoC), and more particularly to dataflow management in Networks on Chip (NoC).

STATE OF THE ART

FIG. 1 represents an example of a network on chip of matrix (or meshed) topology, as described in European Patent EP1701274.

This network comprises a plurality of busses arranged in rows (horizontal busses Bh) and columns (vertical busses Bv). A router RTR is arranged at each intersection between a horizontal bus and a vertical bus to enable a point-to-point connection to be made between each (horizontal and vertical) bus segment that reaches it. Furthermore, each router RTR is connected to a local resource RSC which can be a data producer or consumer.

This kind of network is designed to make any resource RSC communicate with any other resource. The resources that communicate with one another and the paths that the communications take are generally determined in advance and programmed in the network management logic.

Communications are often made in data packets. A packet is a set of words having the width of the bus, preceded by a header containing information relative to the packet, in particular its destination.

In telecommunication networks, for example ATM, various techniques are used for providing quality of service. These techniques are generally based on throughput limitations imposed at the network input nodes. The article "A Calculus for Network Delay, Part I: Network Elements in Isolation" by Rene L. Cruz, published in IEEE Transactions on Information Theory, Vol. 37, No. 1, January 1991, describes the general principles of these techniques, among other quality of service issues.

Networks of this kind operate in "connection" mode, i.e. a transmitter node has to negotiate a connection before it can send packets. The establishment of a connection also defines a fixed path via which the packets will transit between the source and destination throughout the duration of the connection. If the same source has to send packets again to the same destination after the connection has been interrupted, a new connection is negotiated which can allocate a different path, this path being computed dynamically according to the network congestion conditions.

The methods used in such networks to provide quality of service are implemented by routers having large available computing resources. It is therefore not realistic to attempt to implement them in a network on chip where the network implementation should be simple for the purpose of saving silicon area.

Simple routing methods, for example of worm-hole routing, are therefore preferred in a NoC. With such a method, the packet header contains the precise path the packet is to take, and the packets are indivisible, that is to say a router only starts transmission of a new packet on a bus segment if the previous packet has been fully transmitted. Routers are not allowed to mix words belonging to different packets on a segment the "worm" remains integral.

FIG. 2 schematically represents a router usable in this context. The rout er manages five directions, i.e. the four directions corresponding to the bus segments called North (N), South (S), East (E) and West (W), and a direction L corresponding to the local resource.

A four-input multiplexer MX is assigned to each output direction. These four inputs correspond to the inputs of the router that are not assigned to the direction of the multiplexer. For example, the North output multiplexer MXN receives inputs L, S, E and W of the router. In other words, the router prevents a packet entering via one direction from exiting via the same direction.

Furthermore, each multiplexer input is preceded by a FIFO queue 20 designed to store the words of the packets awaiting to be output.

A state machine, not represented, controls the selection effected by the multiplexers and the writing of the words entering via the five directions in the FIFOs.

In the case of worm-hole routing, the incoming packet header indicates to the router via which direction the packet is to be output. The state machine decodes the header and writes the successive words of the packet in the appropriate FIFO (among the four FIFOs to which the input is connected).

The multiplexers are controlled to process one packet at a time, in other words, the words of one FIFO are extracted consecutively by the multiplexer so long as they belong to the same packet. When the last word of a packet has been extracted from a FIFO, the multiplexer processes the next FIFO according to a fixed priority mechanism. This priority mechanism is often circular (Round Robin), as it is simple to perform and gives an equal chance to each incoming direction.

One drawback of this type of routing is that it may punctually introduce large and indeterminable latencies between a source and destination, which makes it incompatible with applications demanding quality of service (QoS), in particular in real-time applications.

FIG. 3A illustrates a situation where this drawback can occur. The network is represented schematically by a mesh and nodes where a node designates either a router, a resource or both. The nodes are designated by Nxy, where x is the row index and y the column index.

In this example, there are three simultaneous transmission communications from nodes N10, N01 and N02 to node N13. The communications from nodes N10 and N01 both cross nodes N11 and N12. The communication from node N02 crosses node N12. It is easily understandable that the segment between nodes N12 and N13 is greatly solicited.

FIG. 3B represents the elements of routers N11 and N12 affected by these communications. West FIFO FW of East multiplexer MXE of node N12 receives packets of two communications, i.e. those coming from nodes N01 and N10, transmitted by East multiplexer of node N11, This FIFO fills up quickly, especially because it is probably not yet being emptied by multiplexer MXE which is busy emptying the FIFO connected to node N02.

It is likely that at the moment FIFO FW is full, it partially contains a packet being transmitted by node N11. Node N12 indicates to node N11, by means of an overflow prevention mechanism, that it cannot receive any more data, as the following data from node N11 would necessarily belong to the packet being written in FIFO FW. As node N11 can no longer send data, the FIFOs of its multiplexer MXE fill rapidly, and node N11 will have to indicate in turn to a preceding node not to send any data. And so on, until FIFO FW starts to be emptied.

Furthermore, a communication N00-N01-N21 not taking any path with heavy traffic could nonetheless stall for a certain time on account of the fact that communication N01-N13 will stall because of congestion of segment N12-N13. Stalling of this communication may itself delay a communication N00-N02, and so on.

The situation is not unblocked instantaneously when FIFO FW starts to be emptied. It is in fact only when a location in FIFO FW becomes available that node N12 indicates to node N11 that it can again receive data. This introduces an additional latency by each of the nodes that were blocked.

Such a situation, that can occur randomly in spite of the care taken in the routing choices when programming the network, can lead to a large and unknown latency in routing of the packets.

Increasing the size of the FIFOs postpones the occurrence of such problems but it does not fully overcome the problems if reasonable FIFO dimensions are to be used.

To improve the situation, it has been proposed to introduce virtual channels into this type of network, as disclosed in Patent EP1701274. In a network with virtual channels, each of the four inputs of the multiplexers of a router comprises as many FIFOs as virtual channels. The packets take the same physical links as in the network and are directed to the appropriate FIFOs on arriving at the routers, the FIFO being identified by the virtual channel number included in the packet header.

Different priority levels can thereby be assigned to the virtual channels, and high priority packets, for example having real-time constraints, will be routed via a high-priority virtual channel that each router will process first.

This solution is satisfactory when the high-priority virtual channels are taken by very few communications. When the number of communications taking these high-priority channels increases, the system is confronted with the same problem as set out above in each virtual channel, and the latency in the lower-priority channels becomes even greater.

Time Division Multiplex (TDM) synchronous networks, such as the "Aetheral" network from Philips, do not present these drawbacks, but they are notably more complex, very sensitive to variations of parameters and of silicon technologies, and have trouble tolerating contingencies. They also require particular care in placing of the elements of the chip to ensure synchronism at all points of the chip.

SUMMARY OF THE INVENTION

There is therefore a need for a network of simple structure yet offering quality of service.

To fulfil this need, a method for limiting the throughput of a communication in a meshed network is provided, comprising the following steps: allocating fixed paths to communications likely to be established on the network; identifying the communications likely to take a mesh segment; allocating respective throughput quotas to the identified communications such that the sum of these quotas is less than or equal to a nominal throughput of said segment; and measuring the throughput of each communication at the input of the network and temporarily suspending the communication when its quota is reached.

According to an embodiment, the method further comprises the following steps: allocating to said mesh segment a budget of data units over a reference time interval; allocating a quota of the budget to each communication likely to take the segment; counting the data units inserted into the network by each communication during a current reference interval; suspending a communication when the count of data units inserted by the communication reaches the quota allocated to the communication; and resuming the suspended communications at the next reference interval.

In order to reduce the maximum latency of the network, the communication may be submitted to additional throughput limiting at the level of an intermediate node between the source and destination of the communication.

BRIEF DESCRIPTION OF THE DRAWINGS

Other advantages and features will become more clearly apparent from the following description of exemplary embodiments, illustrated by means of the accompanying drawings, in which:

FIG. 8 represents a detailed embodiment of a throughput limiter;

FIGS. 9A to 9C illustrate a packet burst situation that can transiently result in the processing capacity of the routers to be exceeded;

DESCRIPTION OF A PREFERRED EMBODIMENT OF THE INVENTION

Figure 1:
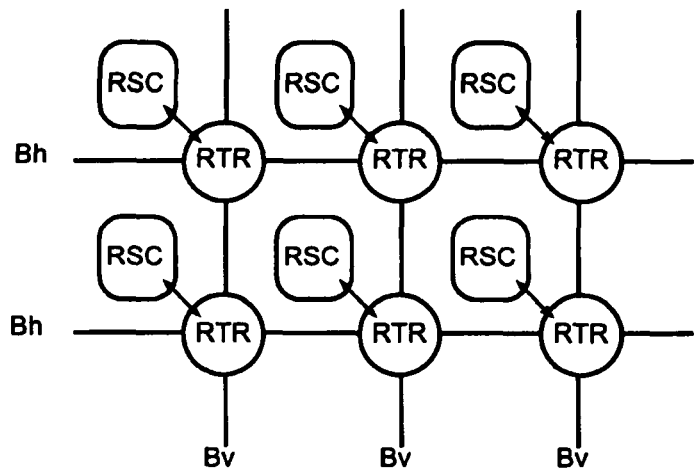
FIG. 1 schematically represents a conventional network on chip of matrix (or meshed) topology.
Figure 4:
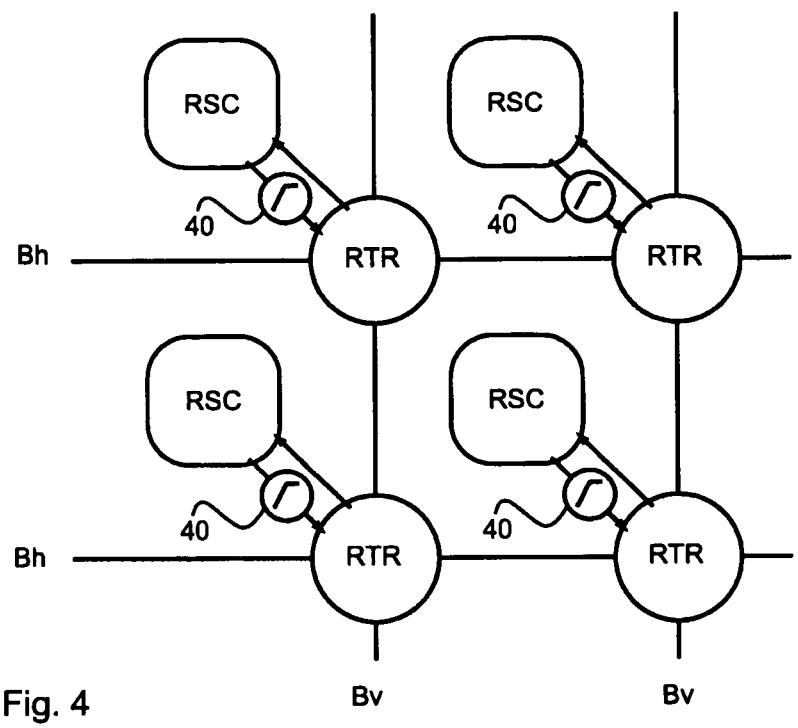
FIG. 4 schematically represents a network on chip of the type of FIG. 1 incorporating throughput limiters.

FIG. 4 represents a network on chip of the type of FIG. 1 incorporating an improvement whereby the maximum latency of the network can be established at a bounded and determinable value. This figure uses elements of the network of FIG. 1 and designates them by the same references.

According to the shown embodiment, the network bound transmission link of each resource RSC comprises a throughput limiter 40. This throughput limiter is for example incorporated in the network interface of the resource.

Each throughput limiter 40 comprises a table whose records associate a transmission throughput quota to each transmission communication that can be established by the corresponding resource to another element of the network.

To guarantee optimum performance, a constraint imposed on the choice of these quotas is that the sum of the throughputs of the communications likely to transit in the same direction in a network segment is less than or equal to the maximum transmission throughput of this segment.

This rule for calculating the quotas presupposes that the paths taken by all the communications are known. This does not give rise to any difficulty in a network on chip where, for reasons of simplicity, routing of the communications is static and defined in advance. This routing and also the quotas are then in the form of configuration parameters stored in a non-volatile memory and programmed in the chip on each power-up.

Figure 3A:
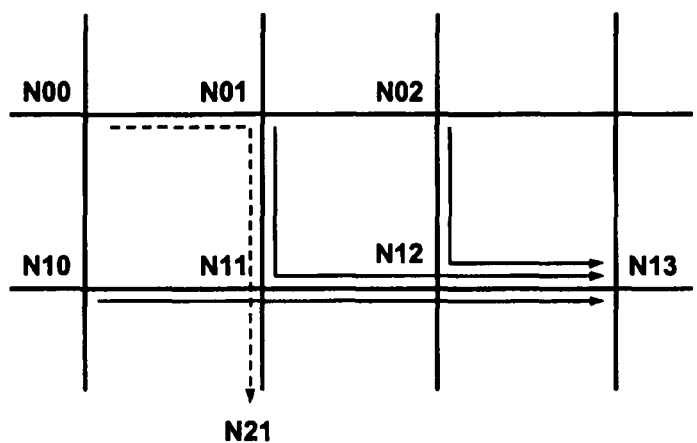
FIG. 3A represents exemplary communications established between nodes of the network of FIG. 1.
Figure 3B:
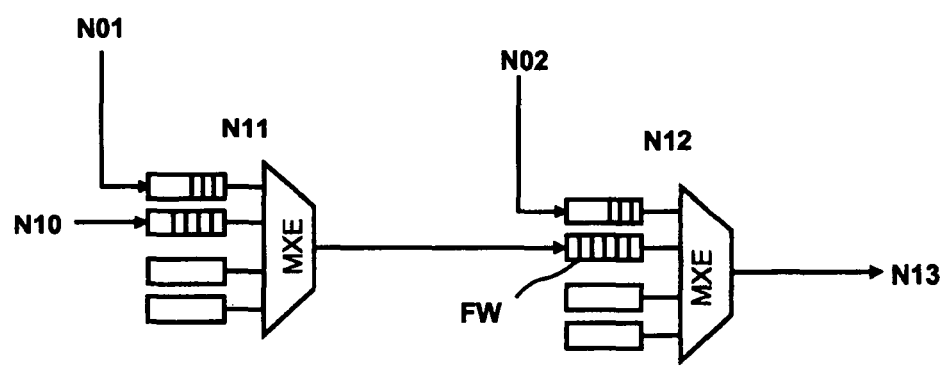
FIG. 3B represents elements of the routers involved in the communications of FIG. 3A.
Figure 5:
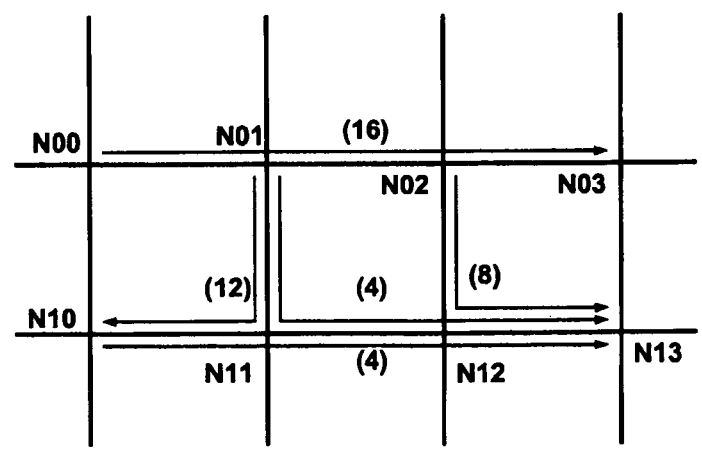
FIG. 5 illustrates an example of throughput allocation in a network of the type of FIG. 4.

FIG. 5 illustrates an example of allocation of throughputs in a network of the type of FIG. 4. The same node notations are used as in FIG. 3A described above.

Node N00 can establish a transmission communication to node N03 crossing nodes N01 and N02.

Node N01 can establish two transmission communications, one with node N10 crossing node N11 and the other with node N13 crossing nodes N11 and N12.

Node N02 can establish a transmission communication with node N13 crossing node N12.

Node N10 can establish a transmission communication with node N13 crossing nodes N11 and N12.

The segments that are the most solicited are segment N12-N13 which can see three communications in the same direction, and segments N01-N11 and N11-N12 which can both see two communications in the same direction.

An example of throughput quotas assigned to the communications has been indicated in brackets, assuming that the maximum throughput is 16 data units per time unit. Thus, communication N00-N03 has the maximum quota 16, as this communication is the only one in the segments it uses. All the other communications use segments shared with other communications and therefore have to share the maximum throughput. Quotas of 8, 4 and 4 are respectively allocated to communications N02-N13, N01-N13 and N10-N13 passing via the busiest segment. This leaves a quota of 12 for communication N01-N10.

The constraints imposed on allocation of the quotas does however leave room for flexibility in a large number of cases. Distribution of the quotas is then performed by allocating larger quotas to the communications that are most demanding in terms of bandwidth.

Figures 6, 7:
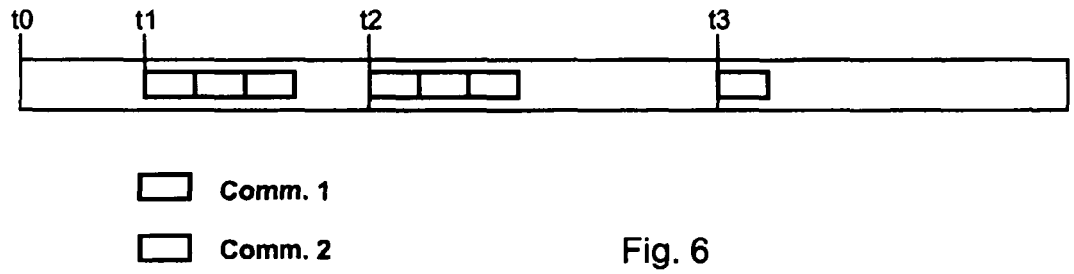
FIG. 6 illustrates an example of packet transmission by a resource of the network of FIG. 4 showing the involvement of a throughput limiter.
FIG. 7 represents a table enabling the minimum size of the FIFOs of the routers and the maximum latency per router to be determined for an example of parameters of a throughput limiter.

FIG. 6 represents an example of throughput limiting implemented by a particular embodiment of throughput limiter 40. In this embodiment, the throughput limiter operates on fixed consecutive time intervals, hereafter referred to as reference intervals. A reference interval corresponds to a budget of data units, this budget being the number of data units that can be transmitted at maximum throughput in a segment during one reference interval. The throughput quotas of the communications are thus expressed in data units per reference interval.

In the case of a worm-hole routing network, where each packet is indivisible while travelling through the nodes, the data unit is preferably expressed in packets. In other types of networks, the data unit may be different, for example words.

The duration of the reference interval is preferably the same for each throughput limiter 40 of the network. It is not necessary for the reference intervals to start at the same time at the level of each limiter, but they preferably follow one another at the same frequency and are therefore synchronized with the frequency of a common time base.

As the chip incorporating this type of network can be particularly large, technological variations may exist between distant points of the chip. The operating speeds of the routers, which are asynchronous, can thus vary geographically. As the limiters are synchronized with the same time base, the duration of the reference intervals remains strictly constant over the whole of the chip. For the slower routers, the duration of the reference interval could correspond to less than the budget, and for the quickest routers to more than the budget.

For the quickest routers operating at full speed, transmission of the last packet would be systematically completed before the end of each reference interval. This would mean that the bandwidth available between the end of the last packet and the end of the interval is not exploited, but this would not affect the satisfactory operation of the system.

For the slowest routers operating at full speed, transmission of the last packet of a current interval would systematically overflow to the next interval. One consequence would be that the FIFOs of the router would not be completely emptied during a reference interval. This would introduce a risk of FIFO overflow and therefore of communication stalls between nodes, although with a considerably lower likelihood than in a conventional system.

In a failsafe approach, the duration of the reference interval will therefore be chosen according to the slowest routers. It is however not excluded that, in assessing the probabilities, a duration may be chosen tending towards that corresponding to the quickest routers.

The value of the budget defines the granularity of the quotas that can be allocated to the communications. The larger the budget, the finer the granularity, but the higher the maximum latency in the network. The choice of this budget will therefore be made in accordance with the desired granularity/latency trade-off.

In FIG. 6, three consecutive time intervals start at times t0, t2 and t3. The resource associated with the limiter can establish two transmission communications 1 and 2. Respective quotas of 2 and 1 packets are for example allocated to these communications.

At a time t1, in the course of the first time interval, the resource starts the two communications. The first has five packets to transmit, whereas the second has two packets to transmit. The quotas being 2 and 1, the resource can only transmit two packets of communication 1 and one packet of communication 2 during the first time interval. Assuming the resource transmits the packets with a circular priority, the packets of communications 1 and 2 are transmitted alternately, as shown.

Once a communication has reached its quota in an interval, the limiter signals the resource to cease transmitting for this communication. The resource then stores the packets in its local memory, awaiting to continue transmission at the next interval. The resource will be able to dedicate the waiting time to other tasks and communications.

A new time interval starts at time t2. The resource transmits the last packet of communication 2 and then two new packets of communication 1. Communication 1 does not end yet, as it still has one packet to transmit.

A new time interval starts at time t3 in the course of which the last packet of communication 1 is transmitted.

FIG. 7 represents a table enabling the minimum (and optimum) size of the FIFOs of the routers and the maximum latency introduced by the routers to be determined in the case where the throughput budget is equal to 16.

Figure 2:
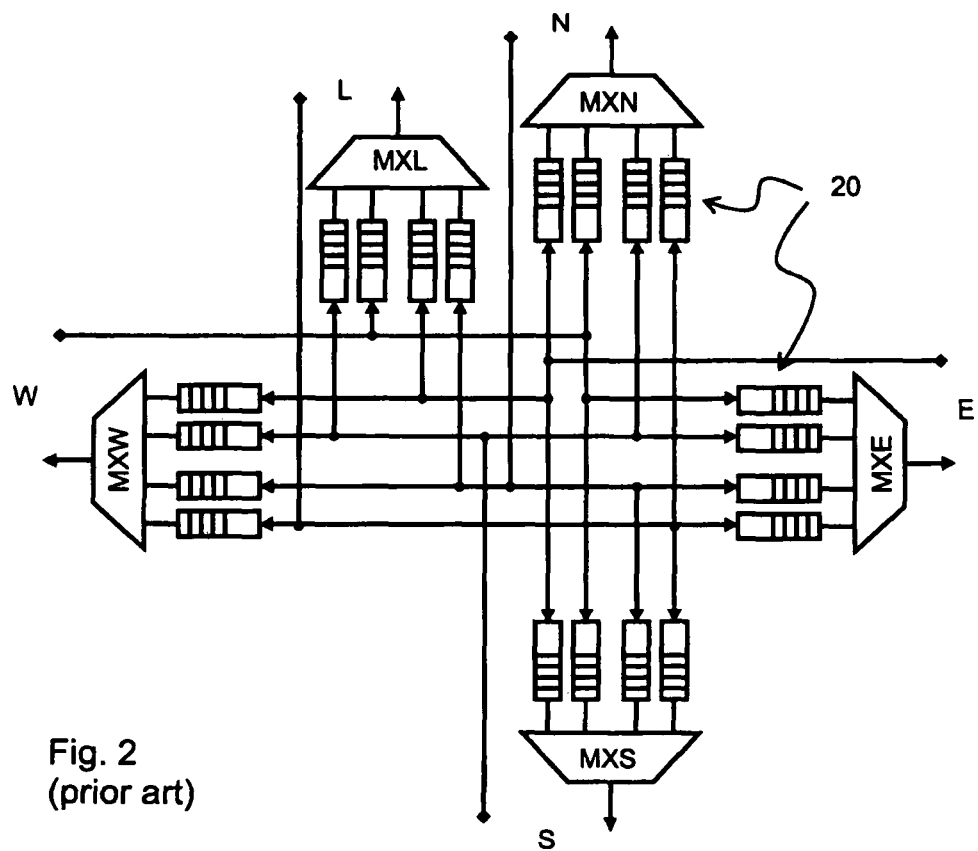
FIG. 2 schematically represents the structure of a router of the network of FIG. 1.

The table refers, for example, to an East multiplexer and its FIFO memories as represented in FIG. 2. The first four rows represent the packets arriving on each of the FIFO memories of the four inputs (N, L, W, S) of the multiplexer. Row QE represents the multiplexer output. Rows FN, FL, FW and FS indicate the number of packets stored in each of the FIFO memories. The last row indicates the latency in number of packets undergone by the outgoing packet.

Each column corresponds to a packet transmission cycle. The set of columns represented corresponds to a reference time interval where the multiplexer, on account of the throughput limiters, processes at most the number of packets corresponding to the budget, here 16. All the packets received in the interval are also output in the course of the same interval.

The situation illustrated is that of the worst case of FIFO latency and size in the case where the processing priority of the inputs is circular. This situation occurs when the 16 packets of the budget are distributed, as illustrated, in 2, 2, 3 and 9 packets arriving on four different inputs, and the priority cycle happens to be in a state such that the FIFOs having the least packets are selected first. The table has been drawn up for the case of circular priority in the order of inputs N, L, W, S, which respectively receive 2, 2, 3 and 9 packets.

At cycle 0, the first four packets arrive in each of the four respective FIFOs. FIFO FN is processed immediately and its packet N0 is transmitted by the multiplexer. Packets L0, W0 and S0 are stored in FIFOs FL, FW and FS. FIFOs FN, FL, FW and FS thus respectively contain 0, 1, 1, 1 packets.

At cycle 1, the multiplexer transmits packet L0 contained in FIFO FL whereas new packets N1, L1, W1 and S1 arrive and are written in FIFOs FN, FL, FW and FS. These FIFOs respectively contain 1, 1, 2, 2 packets.

At cycle 2, the multiplexer transmits packet W0 contained in FIFO FW whereas two new packets W2 and S2 arrive in FIFOs FW and FS. FIFOs FN, FL, FW and FS respectively contain 1, 1, 2, 3 packets.

At cycle 3, the multiplexer transmits packet S0 contained in FIFO FS whereas a packet S3 arrives in FIFO FS. The number of packets in the FIFOs is unchanged compared with the previous cycle.

At each of the next five cycles, a new packet S arrives in FIFO FS whereas the FIFOs continue to be read circularly. FIFOs FN, FL and FW are all empty on arrival of the last packet S8. The budget of 16 packets is then attained and no more packets arrive for the multiplexer until the next time interval.

During the 7 remaining cycles, the FIFO FS is read at each cycle to extract the last packets S.

It can be observed that the largest number of packets stored in a FIFO is 7, which also corresponds to the maximum latency attained. The latency is the difference between the index of the output cycle of a packet and the index of the input cycle of the packet.

Thus, by using throughput limiting with a budget of 16 and circular priority, the maximum latency introduced by each router is 7 packets. This value can be increased by a known systematic delay introduced by certain types of routers (pipeline routers). The maximum latency of the network is thereby equal to the maximum number of routers on a path between two nodes, multiplied by the maximum latency of the routers.

The latency is therefore bounded and determinable, whereby this solution offers quality of service and is compatible with real-time applications.

The most solicited FIFO memory in this example has a depth of 7 packets. If a distinct memory is used for each FIFO, each one has a depth of 7 packets. The total memory size required for each multiplexer would then be 28 packets.

In certain router configurations, the FIFO memories are implemented in a single memory associated with a suitable management state machine. In this case, the memory has sufficient space to contain all the packets in a situation where the number of packets stored in all of the FIFOs together is maximum. This situation arises when the packet budget is distributed equally over the router inputs—four packets per FIFO taking the example of FIG. 7. It can then be ascertained that the FIFOs associated with a multiplexer together store at most 12 packets. A single memory serving the purpose of performing the function of the four FIFOs therefore has a size of 12 packets. This size is compatible with the maximum latency situation of FIG. 7, as the number of packets stored by all the FIFOs together only amounts to 7 in this situation.

Determination of the maximum latency has been described above for a particular budget and priority management case. Those skilled in the art will be able to extrapolate this calculation to other situations.

In a conventional network on chip of the type described in relation to FIG. 1, mention was made of a FIFO overflow prevention mechanism where a router indicates to a previous router that it can no longer receive data when one of its FIFOs is full (hand-shake mechanism). This implies that there is a risk of the FIFOs overflowing. Thanks to the throughput limiting system described here, the FIFOs are never likely to overflow provided that their size is chosen as explained here and that the quotas are suitably allocated. In other words, the network can be simplified eliminating the hand-shake mechanism.

As the system has been described, the quotas can be allocated freely under the responsibility of the designer who defines the routing, i.e. the designer could allocate quotas so that the budget is exceeded in certain segments. This budget overrun can moreover be deliberate, for example if the designer knows that two communications taking the same segment are never simultaneous. To avert a risk of error, the hand-shake mechanism is preferable. However, if the designer systematically uses a computer tool that verifies conformity of the quota allocations, a hand-shake mechanism is superfluous.

FIG. 8 represents an embodiment of a throughput limiter 40 associated with a communication. It comprises a register 80 in which the communication quota is recorded. A counter CNT is clocked by a signal PKT which presents a pulse for each packet transmitted. Counter CNT is further reinitialized periodically by a signal RTC established by a time base common to the system, for example a real-time clock. This signal RTC determines the succession of the reference time intervals.

A comparator 82 activates a stop signal STOP of the communication when the content of counter CNT becomes equal to the quota contained in register 80. At the next time base pulse RTC, counter CNT is reinitialized and signal STOP is deactivated.

Such a throughput limiter is associated with each transmission communication that the associated resource can establish. The communication currently transmitted by the resource is determined by a management state machine which directs the transmitted packets to the associated router and keeps a count of the packets. This state machine is designed to direct the clocking signal of packets PKT to the limiter corresponding to the current communication and to take account of the STOP signal of this same limiter. As soon as the state machine receives the STOP signal, it suspends the current communication and switches to the next communication if there is one. In the case where the packets are indivisible, if the STOP signal is received during transmission of a packet, the communication is suspended after the last word of the packet has been transmitted.

The description of the network has up to now been made in a rather simple, and most likely situation, for sake of clarity. A network of the type described here can in fact be subject to a packet burst phenomenon leading to localized and transient throughput overshoots in certain communications. These transient throughput overshoots result in the need for a size increase of the FIFO memories of the is involved routers to cope with this phenomenon. This phenomenon is illustrated hereinbelow in the frame of a simple case where the throughput budget is 8 (8 packets per reference interval).

FIG. 9A represents a succession of nodes on the path from West to East of a communication having a quota of 5. Furthermore each node receives a quota 1 communication on each of its other three directions, and each of these communications is directed to the East output of the node. Each of the segments between the represented nodes is therefore at its maximum capacity of 8. For sake of clarity, the output direction of each of the quota 1 communications at each second node reached has not been indicated. This direction can be any direction among North, South and Local.

FIG. 9B illustrates the beginning of a packet burst phenomenon that can occur in the configuration of FIG. 9A, for example at the level of the East router of the first node of FIG. 9A. A packet arriving via any one of inputs N, L and S of a router is noted "X". The packets arriving via the West input (W) are noted "w".

Nothing happens during the first three cycles 0, 1, and 2. At cycle 3, the router receives a packet on each of its four inputs. At each of the following four cycles, input W receives a packet. The budget is spent just at the end of the interval.

Five new packets arrive on input W right at the beginning of the next interval, at cycles 8 to 12. No packets arrive via the other inputs. This situation is repeated at the third interval (not represented in full).

In the case where the circular priority processing of the inputs finishes with input W, output QE of the router is as illustrated. Packets X are output at cycles 3 to 5 and packets w are output at the following cycles. It can be observed that, as from cycle 6, output QE provides fifteen grouped packets w. These packets all arrive on input W of router E of the next node. This router will in particular have to process eight packets w and possibly three other packets in a single reference interval, that is to say three packets more than the budget.

At each following node, a new sequence of 5 packets w can thus be grouped with the previous sequence. This happens in particular when the conditions illustrated in FIG. 9B are repeated at each node crossed.

FIG. 9C illustrates the possible subsequent events at the level of the second and fourth nodes of FIG. 9A (respectively in the first and second halves of the table). Inputs N, L, S, and W of the router are indexed by the node number (2 and 4).

Packets w provided by output QE of the router of FIG. 9B arrive on input W2 starting from cycle 6. The other inputs N2, L2 and S2 of the router each receive a packet X at cycles 6, 8, 16 and 24, i.e. right at the start of arrival of packets w, and at each start of the following reference intervals.

In the case where the circular priority processing of the inputs finishes with input W2, output QE of the router is as illustrated. Line FW indicates the filling state of FIFO W at each cycle. It can be observed that the filling reaches a maximum of 9 as from cycle 18, just after a time interval where the number of packets to be processed exceeds the budget by 3.

In the second part of the table, corresponding to the fourth router, the packets received by input W4 arrive with a sequence that may correspond to that of FIG. 9B after crossing two nodes. This sequence comprises a continuous flow of 25 packets w starting at cycle 12.

Furthermore, at cycle 12, the other inputs N4, L4 and S4 of the router each receive a packet X. At the start of the next intervals, i.e. at cycles 16, 24 and 32, the router also receives a packet X on each of inputs N4, L4 and S4.

Output QE again corresponds to the case where the priority is such that input W4 is processed last. It can be observed that filling of FIFO W reaches a maximum of 12 at cycle 26, shortly after the router has had to process two consecutive reference intervals where the number of packets exceeded the budget by 3.

These simplified examples illustrate that the size of the FIFO has to be selected according to the maximum number of nodes a communication can cross.

The network with throughput limitation described here in fact happens to be a particular case of a network with "(σ, ρ)-regulation", the general theory of which is described, for example, in the article by Rene L. Cruz mentioned in the introductory section of the present patent application. The term a designates the maximum burst size of a communication and ρ its mean long-term throughput.

This theory, applied to the network described here, reveals that maximum filling of the FIFOs is equal to F+3h, where F is the maximum size calculated for the FIFOs without taking the burst phenomenon into account (it has been seen that F=7 using a budget of 16 packets per interval), and h is the maximum number of nodes involved in the communication. The term "3" corresponds to the number of inputs of the router, less 1.

Given that the communication paths are fixed in advance, the maximum number of nodes involved in the communications is known. The minimum size of the FIFOs, which moreover determines the maximum latency introduced by the network, can therefore be calculated.

It can be seen that the size of the FIFOs increases by 3 packets as from the first node involved. This is due to the fact, illustrated in FIG. 9B, that the budget of the first reference interval can be used only at the end of the interval and can give rise to grouping, as from the first node, with packets arriving at the start of the next interval.

This edge effect related to the first involved node can be avoided by configuring the throughput limiter in such a way that it postpones until the next interval any packet arriving in the last three cycles of the interval, for communications of budget greater than 3.

Figure 10:
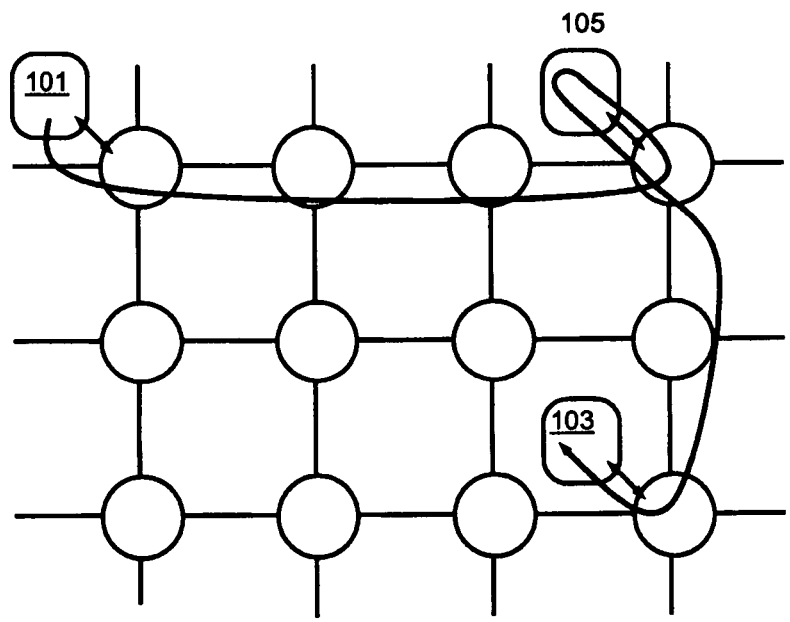
FIG. 10 represents a solution enabling limitation of packet grouping.

FIG. 10 illustrates a solution enabling significant reduction in the minimum size of the FIFOs, and therefore of the latency of the network.

A communication between a resource 101 and a resource 103 involves 6 nodes. Assuming 6 to be the maximum number of nodes involved in communications on this network, the size of the FIFOs is chosen at least equal to F+3×6, i.e. 25 in the case where the budget is 16 packets per interval. The maximum latency is then 5×25=125 packets.

To reduce the size of the FIFOs, the longest paths are broken down virtually into shorter paths. For this, as represented in FIG. 10, the communication is made to exit at an intermediate node that re-injects the communication into the network as if it were a communication coming into this node, that is to say passing through the throughput limiter of the node. The throughput limiter in this case ensures that packet bursts are again spread over several reference intervals, while respecting the quota allocated to the communication.

The size of the FIFOs is then chosen according to the longest sub-path resulting from the breakdown. In the example of FIG. 10, the longest sub-path involves 4 nodes, which results in a FIFO size of 7+3×4=19 packets and a latency of 3×19=57 packets.

This "breakdown" technique does not globally increase the delay undergone by the communication. The first packets received by the intermediate node, which are those that underwent the largest delay due to the grouping phenomenon, will in fact be retransmitted immediately. The last packets are those that underwent the least delay, and the fact that they are retransmitted at later reference intervals merely equalizes their delay with the delay undergone by the first packets. Furthermore, the quota of the communication already being reserved on this path, the intermediate node cannot affect the communication more than is allowed by the quotas of the other communications on this same path.

The breakdown technique may be implemented fully in software by breaking a communication down logically into several sub-communications crossing intermediate nodes. Each intermediate node becomes a recipient that will execute a task to process the communication by simply replicating it to another node.

Such an implementation does however involve a processing overhead that is likely to introduce a non-negligible delay in the communication to the final recipient.

Figure 11:
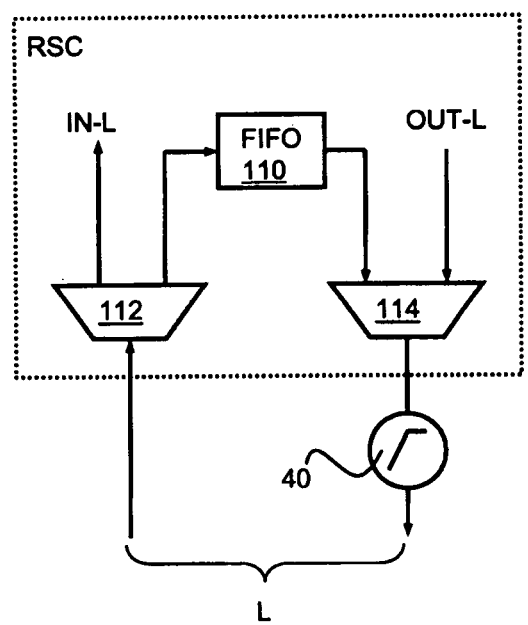
FIG. 11 represents an embodiment of a circuit enabling an efficient implementation of the solution of FIG. 10.

FIG. 11 schematically represents a very simple circuit enabling a hardware implementation of this breakdown technique. The resource RSC connected to the node comprises a FIFO memory 110 for storing the packets to be retransmitted on the network.

Incoming link L, coming from router L of the node, arrives on a demultiplexer 112. The control logic of this demultiplexer is designed to recognize a packet intended for the local resource, in which case the packet is sent to the local resource via a line IN-L, or a packet intended to be retransmitted over the network, in which case the packet is stacked in FIFO memory 110.

The output of a multiplexer 114 is connected to the node's input L by means of throughput limiter 40. Multiplexer 114 performs selection between a packet coming from the local resource via a line OUT-L or a packet from FIFO memory 110.

The packets of a broken-down communication will be provided with a header identifying the intermediate node (or intermediate nodes). In the case of worm-hole routing, the header normally contains two bits per crossed node, indicating the next direction at the level of each node. This "next direction" for each intermediate node will be the local direction.

The node then directs the packet to its router L where it awaits its turn in the corresponding FIFO of the router (FIFO W in the case of FIG. 10) before arriving on demultiplexer 112. Demultiplexer 112 recognizes the nature of the packet and stacks it in FIFO memory 110. Arrival of the packet in FIFO memory 110 is indicated to multiplexer 114 which takes charge of resending it over the network, taking into account the available budget determined by throughput limiter 40.

The nature of the packet ("for the local resource" or "to be retransmitted") can be recognized by comparing the communication identifier conveyed in the header with a local routing table. This routing table can contain all the communication identifiers of the network and their destinations or only the identifiers of the communications intended for the local resource. In the former case, the packet headers need only contain the path conveying the packets to the intermediate node. Upon retransmitting the packets, the intermediate node will be able to establish the path to their final destination and insert it in their headers.

In the latter case, the packet headers contain the full path to the final destination, plus the information identifying the intermediate node. The intermediate node, not finding the communication identifier in its routing table, determines that the packets are to be retransmitted. The packets will be retransmitted with, in their header, the remainder of the path to be taken to their final destination.

The packets retransmitted in this way are then processed as packets originating from the local resource itself.

It can be noted that a packet has to transit via the FIFOs of two routers in each intermediate node—that of router L, then that of the router pointing to the final destination. Furthermore, such packets can be superposed on a normal communication entering the local resource. To avoid the problems this can give rise to, the intermediate nodes should be chosen such that the incoming communications of their local resources are non-existent, or at least of low throughput.

Another solution to avoid this problem is for the node to send such packets directly to FIFO 110 without crossing router L. This requires an additional bus to be provided between the node and local resource. Demultiplexer 112 is then no longer required.

By means of a circuit such as that of FIG. 11 provided at the level of each resource, it becomes particularly easy to implement communication breakdown. One or more intermediate nodes are simply identified in the packet headers, and it is these intermediate nodes that deal with the rest. This operation can be performed manually by the network designer or in an automated manner by a design tool engineered to optimize the lengths of the paths.

The invention claimed is:

1. A method for limiting throughput of a communication in a meshed network, the method comprising the following steps:
    allocating respective static paths to potential communications between source nodes and destination nodes of the meshed network, multiple static paths going through a same mesh segment between adjacent network nodes,
    allocating respective static throughput quotas to the static paths such that, in any mesh segment, the sum of the static throughput quotas respectively allocated to all the paths through the mesh segment is at most equal to a nominal throughput of the mesh segment,
    transmitting data units of a current communication in a respective static path,
    measuring the throughput of the current communication at a source node of the communication, and
    temporarily suspending the current communication at the source node when the quota of the respective static path is reached.

2. The method according to claim 1, wherein the nominal throughput of each mesh segment is represented by a budget of data units over a reference time interval, and each throughput quota is represented by a respective quota of the budget of data units, the method further comprising the following steps:
    transmitting data units of the current communication over repeating reference intervals,
    measuring the throughput by counting data units of the current communication during each reference interval,
    suspending the current communication when the count of data units of the current communication reaches the quota allocated to the respective static path, and
    resuming the current communication in the next reference interval.

3. The method according to claim 2, further comprising the step of subjecting the current communication to an additional throughput limiting at the level of an intermediate node between a source and a destination of the current communication.

4. The method according to claim 3, wherein the additional throughput limiting comprises:
    receiving the current communication by a resource connected to the intermediate node, and
    retransmitting the current communication by the resource over the meshed network.

5. A meshed network comprising:
    source nodes able to initiate communications to destination nodes through respective statically allocated paths, multiple paths of the statically allocated paths going through a same mesh segment between adjacent network nodes, a memory location for each static path of the statically allocated paths, the memory location being in the source node of the each static path and containing, in operation, a constant value corresponding to a throughput quota allocated to the each static path, the throughput quota being determined statically such that, in any mesh segment between adjacent network nodes, the sum of the throughput quotas allocated respectively to all the static paths through the mesh segment is at most equal to a nominal throughput of the mesh segment, and a throughput limiter in each source node configured for measuring a throughput of a current communication in a static path starting at the each source node and suspending the current communication when the quota allocated to the static path is reached.

6. The network according to claim 5, wherein the throughput limiter comprises:

a counter for counting data units transmitted by the current communication, a time base arranged to periodically reinitialize the counter, a period of the time base corresponding to the transmission time at the nominal throughput on the mesh segment of a number of data units representative of a throughput budget, and circuitry configured for suspending the current communication when the counter reaches a value corresponding to the throughput quota allocated to the static path of the current communication.

7. The network according to claim 6 wherein a destination node comprises circuitry configured for identifying the destination node as an intermediate recipient of the current communication and for retransmitting the current communication to the meshed network through the destination node's throughput limiter.

8. The network according to claim 7, wherein the circuitry configured for identifying operates on a node identifier conveyed by a header data unit of the current communication.

\* \* \* \* \*